United States Patent [19]

Edwards

[11] 4,340,700

[45] Jul. 20, 1982

[54] PROCESS FOR PREPARING A PHENOLIC RESIN FROM AN ARALKYLENE ETHER AND AN AROMATIC ALDEHYDE

[75] Inventor: Alfred G. Edwards, Stourport-on-Severn, England

[73] Assignee: Albright & Wilson Limited, Oldbury, England

[21] Appl. No.: 294,396

[22] Filed: Aug. 19, 1981

[30] Foreign Application Priority Data

Aug. 28, 1980 [GB] United Kingdom ............... 8027882

[51] Int. Cl.[3] .................. C08G 8/04; C08G 8/28; C08G 8/36
[52] U.S. Cl. .................................... 525/503; 428/436; 525/480; 525/507; 528/129; 528/143; 528/153; 528/154; 528/155; 528/165; 528/219
[58] Field of Search ............... 528/129, 143, 165, 153, 528/155, 154, 219; 525/507, 503, 480

[56] References Cited

U.S. PATENT DOCUMENTS

| | | | |
|---|---|---|---|
| 3,576,788 | 4/1971 | Harris et al. | 528/154 X |
| 3,787,350 | 1/1974 | Harris et al. | 528/219 X |
| 3,838,103 | 9/1974 | Edwards | 525/503 |
| 3,923,721 | 12/1975 | Edwards et al. | 528/129 X |
| 3,936,510 | 2/1976 | Harris et al. | 525/507 |

*Primary Examiner*—Howard E. Schain

*Attorney, Agent, or Firm*—Frishauf, Holtz, Goodman & Woodward

[57] ABSTRACT

A process for preparing a resin containing phenolic groups, in which an aralkylene ether of formula ROCH$_2$.Ar. CH$_2$OR, wherein Ar represents a phenylene group and R is an alkyl group of 1–4 carbon atoms, is reacted with a phenol containing 1–3 hydroxyl groups and at least 2 hydrogen atoms in the aromatic phenolic nucleus, wherein (1) an ether composition which comprises at least 50 molar % e.g. 50–100% of said ether and the remainder of said composition, if any i.e. up to 50% (such as 0.1–50%) is selected from aromatic compounds each with an Ar nucleus having two substituents selected from CH$_3$, CH$_2$OR, CHO, CH(OR)$_2$, said phenol and (2) an added compound of formula R'CHO or R'CH (OR$^2$)$_2$, wherein R' is monovalent phenyl group or substituted phenyl group, in which each substituent is an alkyl group of 1–4 carbon atoms or a chlorine atom, and R$^2$ is as defined for R, are reacted together in a reaction mixture in the presence of a catalyst to form a resin containing phenolic groups, the molar proportion of phenol to the total of aromatic compounds in said ether composition and added compounds being 1.3:1 to 1 to 2.5:1 (e.g. 1.35–2.0:1 such as 1.38–1.8:1 or 1.4–1.7:1 and the molar ratio of CH$_2$OR to the total of CHO and acetal groups being 3:1 to 10:1, and the molar ratio of phenol to the total of CHO and acetal groups being 3.7:1 to 9:1.

18 Claims, No Drawings

PROCESS FOR PREPARING A PHENOLIC RESIN FROM AN ARALKYLENE ETHER AND AN AROMATIC ALDEHYDE

This invention relates to a process for preparing a resin, in particular an aromatic resin containing phenolic residues.

In our British Patent Specification No. 1150203 we describe and claim a process for preparing an aralkylene-phenol resin, which comprises reacting in the presence of a condensation catalyst an aralkylene ether which maybe an aromatic (alkoxymethyl) compound e.g. xylylene glycol dimethyl ether with a molar excess of a phenol, particularly phenol itself. The resin may be mixed with hexamine and used as a moulding powder for curing to moulded articles. While in the above patent specification the pure aralkylene compounds are used, in later patent specification e.g. Jap. publ. appl. No. 84099/78 and British Patent Specification No. 1571487 there is mention also of the use of crude materials containing 65–90% of the particular aralkylene bis (alkoxy methyl) ether, the rest being monoalkoxymethyl ethers, and acetals and aldehydes.

The resins made from the pure aralkylene ethers tend to have low softening points and tend to exhibit cold flow, making them less satisfactory in moulding powders. According to British Patent Specification No. 1363531 use of certain metal salt catalysts during the reaction makes a resin which gives products of reduced cold flow. But for some uses, especially electrical uses, the presence of these salts is undesirable.

We have now found that by adjustment of the aldehyde and acetal content of the aralkylene ether, it is possible to obtain resins of higher melting point with reduced cold flow at will whatever the catalyst, particularly without the need to use the particular metal salt catalysts.

The present invention provides a process for preparing a resin containing phenolic groups, in which an aralkylene ether of formula $ROCH_2.Ar.CH_2OR$, wherein Ar represents a phenylene group and R is an alkyl group of 1–4 carbon atoms, is reacted with a phenol containing 1–3 hydroxyl groups and at least 2 hydrogen atoms in the aromatic phenolic nucleus, wherein an ether composition which comprises at least 50 molar % e.g. 50–100% of said ether and the remainder of said composition, if any i.e. up to 50% (such as 0.1–50%) is selected from aromatic compounds each with an Ar nucleus having two substituents selected from $CH_3$, $CH_2OR$, $CHO$, $CH(OR)_2$, said phenol and an added compound of formula $R'CHO$ or $R'CH(OR^2)_2$, wherein R' is monovalent phenyl group or substituted phenyl group, in which each substituent is an alkyl group of 1–4 carbon atoms or a chlorine atom, and $R^2$ is as defined for R, are reacted together in a reaction mixture in the presence of a catalyst to form a resin containing phenolic groups, the molar proportion of phenol to the total of aromatic compounds in said ether composition and added compounds being 1.3:1 to 2.5:1 (e.g. 1.35–2.0:1 such as 1.38–1.8:1 or 1.4–1.7:1 and the molar ratio of $CH_2OR$ to the total of CHO and acetal groups being 3:1 to 10:1, and the molar ratio of phenol to the total of CHO and acetal groups being 3.7:1 to 9:1.

While in its broadest aspect the invention involves adjustment of the aldehyde and acetal content of any aralkylene di ether by addition of a compound of formula $R'CHO$ or $R'CH(OR^2)_2$, a very important aspect of the invention is the addition to a substantially pure aralkylene diether of said compound or compounds. Thus in a preferred form of the process at least one compound of formula $R'CHO$ or $R'CH(OR^2)_2$ is added to a composition comprising 80–100 molar % e.g. 80–95% such as 80–90% molar % of a compound of formula $Ar(CH_2OR)_2$ and 0–20% e.g. 0–10% or 0–5% in total of one or more compounds with two groups selected from $CH_3$, $CH_2OR$, CHO and/or $CH(OR)_2$ groups attached to an Ar nucleus, the proportion of the compound or compounds added being such as to give with the phenol the mixture with the desired ether acetal and phenol molar ratios.

The aldehyde or acetal is added to form the mixture for use in the process of the invention in an amount to bring the relationship between the ether, aldehyde and phenol ratios within the quoted ranges. Primarily the aldehyde or acetal is added to a composition in which at least one relationship between ether, aldehyde and phenol ratios is outside the quoted range or would be so once the phenol had been added. However the aldehyde or acetal may be added to adjust the relationships already within the given ratio, in order to give preferred proportions, as described below.

The group Ar is a divalent aromatic group which is a phenylene group e.g. a p- or m-phenylene group. The R' group is a monovalent aromatic group which is a phenyl group or a substituted phenyl group with 1–4 substituents each of which is a chlorine atom and/or and alkyl group of 1–4 carbon atoms e.g. methyl group, as in p-methylphenyl or m-methyl phenyl. Thus examples of the added compounds of formula $R'CHO$ and $R'CH(OR^2)_2$ are benzaldehyde, tolualdehyde, and chlorobenzaldehyde and their dimethyl acetals. It is not necessary that, in the added compound, the group R' be derived from the same aromatic group as that of the group Ar. Thus benzaldehyde can be and preferably is added to xylyene glycol dimethyl ether. $R^2$ and R are alkyl groups of 1–4 carbon atoms e.g. methyl groups. The mixture of aralkylene ethers, to which the aldehyde or acetal is added, may be made by side chain chlorination or bromination of the corresponding bis methyl aromatic derivative of formula $Ar(CH_3)_2$ to make the crude aralkylene halomethyl compounds and subsequent reaction of such crude compounds as such, or after purification, with alkali metal alkoxides to form the corresponding alkoxymethyl compounds. The crude halomethyl compounds may be purified e.g. by crystallization to give compounds of 90–100% purity, and the crude alkoxy methyl compounds may also be purified e.g. by distillation.

The phenol, which is reacted with the aralkylene compounds, is a compound or mixture of compounds derived from benzene and containing 1–3, preferably 1, hydroxyl radicals joined to the aromatic nucleus, there being a total of not more than 3 substituents attached to ring carbon atoms of the benzene nucleus apart from one essential hydroxyl group and there being at least two nuclear hydrogen atoms. Thus the phenolic compounds may be of formula $(R^3)_{1-3}.R^4.OH$, where $R^4$ represents a residue from a benzene ring formed by loss of one hydrogen atom and 1–3 further hydrogen atoms depending on the number if any of substituents $R^3$, each $R^3$ is hydrogen, hydroxyl (subject to a maximum of 3 hydroxyl groups in the compound) alkyl of 1 to 8 carbon atoms, e.g. methyl, ethyl, isopropyl, tert. butyl or tert. octyl, phenyl and hydroxyphenyl alkylene, e.g. hydroxy phenylmethylene, -ethylidene and -isopropylidene. Examples of these phenolic compounds are phenol, p-cresol, m-cresol, resorcinol, catechol, 4-methyl catechol, isopropyl catechol, diphenylol propane (bis 2,2-(4-hydroxyl phenyl) propane), diphenylolethane, monoalkyl phenols such as p-ethylphenol, p-tert. butyl phenol and p-tert. octyl phenol, m- and p-phenyl phenol, pyrogallol and phloroglucinol. Mixtures of phenols can be used such as mixtures of mono- and di-hydric phenols, e.g. 4 methyl catechol and catechol and/or resorcinol, such as that sold commercially as phenolic coal tar fraction by Coalite Chemicals. Phenol itself is most preferred.

The aldehyde and/or acetal are added to the ether composition so that the reaction mixture with the phenol contains the proportions of phenol, $CH_2OR$, CHO and acetal groups as given above. The molar proportion of $CH_2OR$ groups and the total of CHO and acetal is 3:1 to 10:1 preferably 3.5:1 to 8:1 e.g. 3.5:1 to 6.5:1 such as 3.5 to 1 to 5.8:1. The molar proportions of phenol to the total of CHO and acetal is 3.7:1 to 9:1, e.g. 3.7:1 to 7.5:1 such as 3.7:1 to 5.4:1. The molar proportion of phenol to $CH_2OR$ groups is usually 0.80–1.11:1 e.g. 0.88:1 to 1.11:1 preferably 0.90–1.1:1 or 0.95:1 to 1.1:1. The molar proportion of phenol to the total of $CH_2OR$, CHO and acetal groups is usually 0.78:1 to 0.89:1.

The molar proportion of CHO to acetal (if present) is advantageously 120–400:1 e.g. 160–300:1 especially when the added compound is an aldehyde.

In a preferred process in which the ether composition comprises 80–95% e.g. 80–90 molar % of compound of formula Ar $(CH_2OR)_2$ and 5–10% of $ROCH_2$ ArCHO and 0–5% molar of the rest, the added compound, which is preferably benzaldehyde, is used in amount of 2–30% e.g. 5–25% and especially 10–25 weight % based on the weight of said ether composition, particularly when the phenol to ether composition weight ratio of 0.8–1.2:1 especially 0.95–1.2:1. Especially in this preferred process Ar is p-phenylene, R is methyl, the added compound is benzaldehyde and the phenol is phenol itself.

Thus the invention also provides a process for preparing a resin containing phenolic groups, in which an aralkylene ether of formula $CH_3 OCH_2—C_6H_4—CH_2OCH_3$ is reacted with phenol, wherein phenol, benzaldehyde and an ether composition, comprising 80–95% or 80–90% molar % of said ether, 5–14 molar % of a substituted aldehyde or formula $CH_3OCH_2.C_6H_4CHO$ and the rest if any (preferably less than 8 molar %) selected from disubstituted benzenes with the two substituents selected from $CH_3$, $CH_3OCH_2$, CHO and $CH(OCH_3)_2$ groups, are reacted together to form the resin, the weight of benzaldehyde to ether composition being 2–30% e.g. 5–25% or 8–25% or 10–25%, the ratio of the weight of phenol to ether composition is 0.8–1.2:1 e.g. 0.95:1–1.2:1 and the molar ratio of phenol to total of aromatic compounds in said ether composition and benzaldehyde being 1.3:1 to 2.5:1.

The reaction between the aralkylene compounds, aldehyde or acetal and the phenol is carried out by heating them together at 60°–200° C. e.g. 60°–150° C. usually in the presence of a condensation catalyst promoting electrophilic substitution in the phenol and removal of hydrogen atoms from the aromatic nucleus of the phenol with the alkoxy group of the aralkylene compound e.g. as methanol by-product which evaporates. Examples of such catalysts are Friedel Crafts catalysts such as metal polyvalent halides e.g. ferric chloride and stannic chloride, and boron trifluoride, but preferably metal free catalysts, e.g. dialkylsulphates with 1–6 carbons in each alkyl group e.g. diethyl sulphate or sulphuric acid are used. Amounts of catalysts of 0.01–2% by weight based on the total weight of the phenol and mixture of aromatic compounds may be used. At the end of the reaction any excess of phenol is evaporated e.g. by heating to 200° C., to leave a resin which has terminal phenolic groups and one or more phenolic groups in intermediate position in its structure e.g. with the residue from one phenolic molecule in each repeat unit in the structure. The resin is cured with a curing agent therefore e.g. epoxides as described in our British Patent Specification No. 1305551 or 1365936 or melamine formaldehyde condensates as described in our British Patent Specification No. 1513771 or 1525401 but preferably with hexamine in amount of 5–20% e.g. 7–15% such as 9–13% by weight based on the weight of resin to form cured articles. Cure temperatures of 100°–250° C., especially 150°–250° C. are usual. The mixture of resin and hexamine may be used to prepare reinforced laminates or combined with moulding additives e.g. fillers, both granular and fibrous and release agents as described in our British Patent Specification No. 1150203.

The invention is illustrated in the following Examples in which the technical grade $\alpha\alpha'$-dimethoxy-p-xylene contained (by gas liquid chromatography 86.7% $\alpha\alpha'$-dimethoxy-p-xylene, 1.4% methoxy-p-xylene, 0.2% $\alpha\alpha'$-dimethoxy-p-xylene. 2.5% -p-tolualdehyde, 9.5% p-methoxymethyl-benzaldehyde and no $\alpha\alpha\alpha'$-trimethoxy-p-xylene, the percentages being on a weight basis.

EXAMPLE 1

Into a reactor fitted with a stirrer and still head were placed phenol (100 g), benzaldehyde (7 g), technical grade $\alpha\alpha'$-dimethoxy-p-xylene (30 g) and diethyl sulphate (2 ml). The mixture was stirred and heated to 110°–120° C. until distillation of methanol started. To the stirred mixture was added over 45 minutes a mixture of technical $\alpha\alpha'$-dimethoxy-p-xylene (66 g) and benzaldehyde (3 g), with distillation of by product methanol. The reaction was continued at 110°–20° C. with distillation of the methanol for a total of 4 hours from the start of the heating. The reaction mixture was then heated to 160° C. first at atmospheric pressure and then under vacuum to remove methanol and phenol. The product (when cold) was an orange solid of softening point 88° C. using a Ring and Ball apparatus. It was cured by heating with 12.5% by weight of hexamine to a hard solid.

EXAMPLES 2–6

In these Examples the phenol, benzaldehyde and ether composition were heated with diethyl sulphate with distillation of by-product methanol at 135°–180° C. When production of methanol ceased, the resin produced was heated to 200° C. to evaporate residue phenol. The products when cold were orange solids, whose softening point was measured. A sample of each resin was mixed with 12.5% by weight hexamine as curing agent and the mixture heated to cure it. The time for gelling of the mixture at 150° C. was noted. The results were as follows:

| Example. | 2 | 3 | 4 | 5 | 6 |
|---|---|---|---|---|---|
| Phenol g. | 57.3 | 57.3 | 114.7 | 114.7 | 349.7 |

-continued

| Example | 2 | 3 | 4 | 5 | 6 |
|---|---|---|---|---|---|
| Ether Composition g. | 58.6 | 60.7 | 114.7 | 107.9 | 314.9 |
| Benzaldehyde g. | 6.15 | 4.0 | 14.8 | 21.6 | 63.2 |
| Diethyl Sulphate ml | 0.25 | 0.25 | 0.5 | 0.5 | 1 |
| Softening point °C. | 93 | 87 | 99 | 105 | 98 |
| Gel time Sec | 142 | 150 | 135 | 134 | |

COMPARATIVE EXAMPLE A

The reaction was performed as in Ex. 2-6, but without the benzaldehyde and using phenol (287 g) the ether composition (324 g diethyl sulphate (0.8 mls). The resin produced an orange solid, had a softening point of 86° C. After being ground to a fine powder and kept for 1 week, the resin had coalesced into lumps, giving the resin (for moulding powder use) no significant storage life.

EXAMPLE 7 AND COMPARATIVE EXAMPLE B

Glass cloth reinforced laminates were made from the resins of Ex. 6 and Comparative Ex. A with hexamine and were tested for flexural strength before and after heat aging. A solution of each resin and 12.5% of hexamine (based on the weight of resin) in methyl ethyl ketone/industrial methylated spirits (3:1 v/v) was used to impregnate glass cloth sold under the trade names Marglass 116T coated with a P705 finish and prepregs were made by heating the impregnated glass cloth for a short time at 125°-144° C. Laminates were made by pressing 11 of these prepregs for 1 hour at 175° C. and 70.3 kg/cm² (1000 psi) and then completing the cure by heating for 6 hrs at 175° C., 4 hrs. while the temperature was raised from 175° to 200° and 13 hrs. while the temperature was raised from 200° to 250° C. The flexural strengths of the laminates were measured according to BS 2782, 304B at room temperature and at 250° C. and the measurements repeated periodically, while the laminates were kept at 250° C. The results were as follows.

| | Flexural Strength (kg/cm²) | | | | | | | |
|---|---|---|---|---|---|---|---|---|
| | Initial | | 100 hour | | 250 hour | | 500 hour | |
| Resin | Room Temp. | 250° C. | Room Temp. | 250° C. | Room Temp. | 250° C. | Room Temp | 250° C |
| Ex. 6 | 5480 | 3870 | 6430 | 4500 | 5480 | 3940 | 4080 | 3730 |
| Comp. Ex. A | 5060 | 3510 | 4290 | 3870 | 4850 | 3580 | 3550 | 2670 |

I claim:

1. A process for preparing a resin containing phenolic groups, in which an aralkylene ether of formula ROCH$_2$.Ar. CH$_2$OR, wherein Ar represents a phenylene group and R is an alkyl group of 1-4 carbon atoms, is reacted with a phenol containing 1-3 hydroxyl groups and at least 2 hydrogen atoms in the aromatic phenolic nucleus, wherein (i) an ether composition which comprises at least 50 molar % of said ether and the remainder of said composition, if any, is selected from aromatic compounds each with an Ar nucleus having two substituents selected from CH$_3$, CH$_2$OR, CHO, CH(OR)$_2$, and said phenol and (ii) an added compound of formula R'CHO or R'CH (OR$^2$)$_2$, wherein R' is monovalent phenyl group or substituted phenyl group, in which each substituent is an alkyl group of 1-4 carbon atoms or a chlorine atom, and R$^2$ is as defined for R, are reacted together in a reaction mixture in the presence of a catalyst to form a resin containing phenolic groups, the molar proportion of phenol to the total of aromatic compounds in said ether composition and added compounds being 1.3:1 to 2.5:1 and the molar ratio of CH$_2$OR to the total of CHO and acetal groups being 3:1 to 10:1, and the molar ratio of phenol to the total of CHO and acetal groups being 3.7:1 to 9:1.

2. A process according to claim 1 wherein at least one added compound of formula R'CHO or R'CH(OR$^2$)$_2$ is present with an ether composition comprising 80-100% molar of a compound of formula Ar(CH$_2$OR)$_2$ and 0-20% in total of one or more compounds with two groups selected from CH$_3$, CH$_2$OR, CHO and/or CH(OR)$_2$ groups attached to an Ar nucleus.

3. A process according to claim 2 wherein the added compound is benzaldehyde or a tolualdehyde.

4. A process according to claim 1 or 2 wherein the molar proportion of phenol to the total of aromatic compounds in said ether composition and added compounds is 1.4-1.6:1.

5. A process according to claim 1 or 2 wherein 2-30 weight % in total of said added compound is present based on the weight of said ether composition.

6. A process according to claim 3 wherein 10-25 weight % of benzaldehyde is present based on the weight of said ether composition.

7. A process according to any one of claims 1, 2 or 6 wherein weight ratio of phenol to ether composition is 0.8-1.2:1.

8. A process according to any one of claims 1-3 or 6 wherein the molar proportion of CH$_2$OR groups to the total of aldehyde and acetal groups is 3.5-6.5:1.

9. A process according to any one of claims 1, 2 or 6 wherein the molar proportion of phenol to the total of aldehyde and acetal groups is 3.7-7.5:1.

10. A process according to claim 3 or 6 wherein (i) an ether composition comprising 80-90 molar % of an aralkylene ether of formula CH$_3$ OCH$_2$ C$_6$H$_4$ CH$_2$OCH$_3$ 5-14 molar % of a substituted aldehyde of formula CH$_3$ OCH$_2$ C$_6$H$_4$CHO and the rest if any selected from di substituted benzenes with two substituents selected from CH$_3$, CH$_3$OCH$_2$, CHO AND CH(OCH$_3$)$_2$ groups, (ii) benzaldehyde and (iii) phenol are reacted together to form the resin containing phenolic groups, the weight of benzaldehyde to ether composition being 5-25%, the ratio of the weight of phenol to ether composition is 0.95:1-1.2:1.

11. A process according to any one of claims 1-3 wherein the catalyst is a dialkyl sulphate with 1-6 carbon atoms in each alkyl group.

12. A process according to claim 1 wherein the added compound is benzaldehyde or a tolualdehyde.

13. A curable composition comprising a resin prepared by a process as claimed in claim 1 and a curing agent therefor.

14. A composition according to claim 13 which comprises 7-15% by weight of hexamine, based on the weight of said resin.

15. A cured object obtained by a curing a composition as claimed in claim 13.

16. A process according to claim 4 wherein the molar proportion of CH2OR groups to the total of aldehyde and acetal groups is 3.5–6.5:1.

17. A process according to claim 5 wherein the molar proportion of CH2OR groups to the total of aldehyde and acetal groups is 3.5–6.5:1.

18. A process according to claim 7 wherein the molar proportion of CH2OR groups to the total of aldehyde and acetal groups is 3.5–6.5:1.

* * * * *